Oct. 4, 1927.
F. S. CARR
1,644,173
LUBRICATING APPARATUS
Filed Feb. 1, 1923
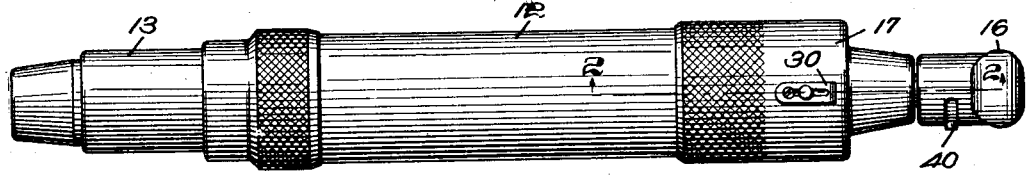
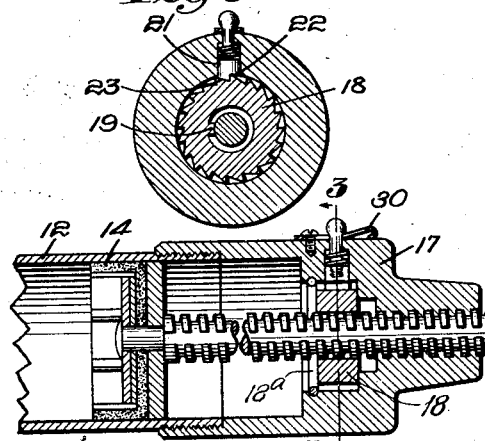
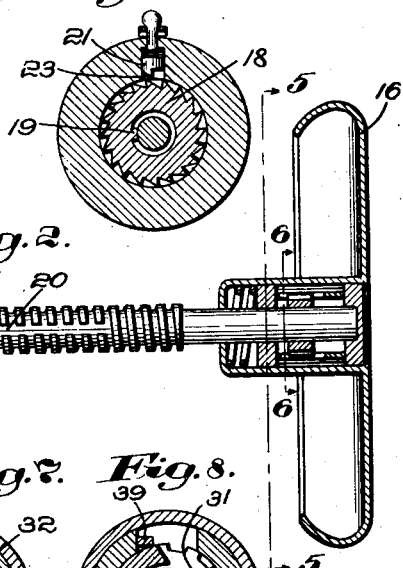
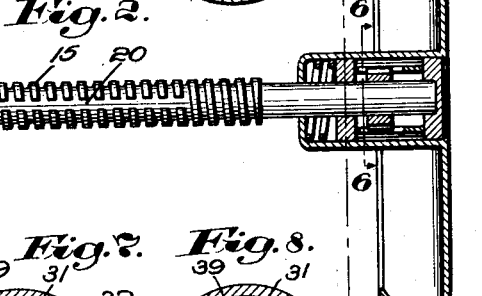
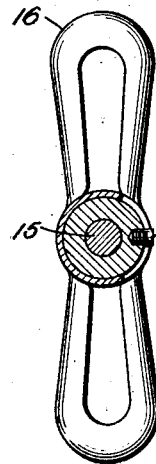
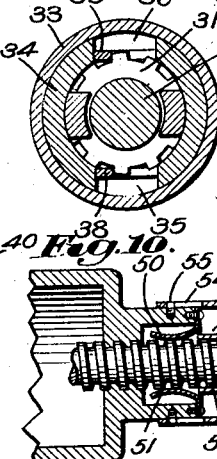
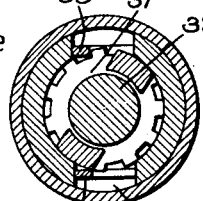
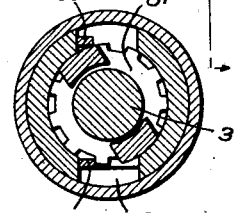
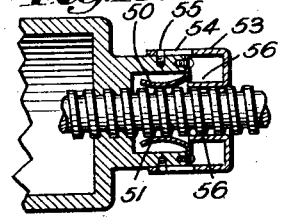
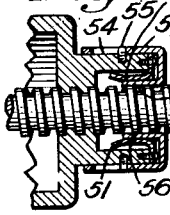
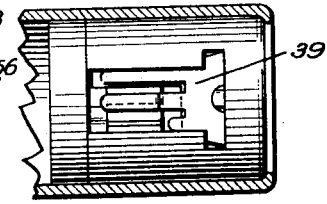
Inventor:
Fred S. Carr.
by Emery, Booth, Janney & Varney
Attys.

Patented Oct. 4, 1927.

1,644,173

UNITED STATES PATENT OFFICE.

FRED S. CARR, OF NEWTON, MASSACHUSETTS, ASSIGNOR, BY MESNE ASSIGNMENTS, TO THE BASSICK MANUFACTURING COMPANY, OF CHICAGO, ILLINOIS, A CORPORATION OF DELAWARE.

LUBRICATING APPARATUS.

Application filed February 1, 1923. Serial No. 616,291.

This invention pertains to improvements in lubricating apparatus and more particularly, though not exclusively, to lubricating apparatus of the type adapted for quick connection to and disconnection from lubricating nipples adapted to receive lubricant under pressure. It is among the objects of the invention to provide a lubricant gun wherein manual operation of forcing out lubricant and/or attachment to and detachment from the lubricant-receiving nipple are facilitated.

In the drawings, which show a preferred form of one embodiment of my invention:

Figure 1 is a side elevation of a lubricant gun;

Fig. 2 is a section on the line 2—2 of Fig. 1, being partly in elevation;

Fig. 3 is a section on the line 3—3 of Fig. 2;

Fig. 4 is a section similar to Fig. 3, showing the parts in different relation to each other;

Fig. 5 is a section on the line 5—5 of Fig. 2, being partly in elevation;

Fig. 6 is a section on the line 6—6 of Fig. 2, being partly in elevation;

Figs. 7 and 8 are sections similar to Fig. 6, but showing the parts in different relation to each other;

Fig. 9 shows a detail of ratchet mechanism hereinafter described; and

Figs. 10 and 11 are central longitudinal sections of the rear head of the gun showing modifications of my invention.

Referring to the drawings and to the preferred form of my invention selected for illustrative purposes, I have shown a lubricant gun including a barrel 12 and nozzle 13 adapted for coaction with the lubricant-receiving nipple, which may resemble that shown in the application of Howard J. Murphy, Serial No. 543,656, filed Mar. 14, 1922. I have provided means for opposing undesired rotation of the piston 14 and threaded piston stem 15 in one or more directions, and a ratchet device operatively interposed between the threaded stem 15 and handle 16 of the gun, so that the piston stem 15 may be rotated in lubricant-expelling direction by oscillatory movement of the handle 16, thus rendering unnecessary the release and grip of the handle during each partial revolution thereof.

I will first describe the means for controlling turning movement of the threaded piston stem 15. Within the rear head 17 of the gun, I have provided a washer 18 provided at its periphery with ratchet teeth. This washer is preferably splined by a projection 19 (Figs. 3 and 4) to a groove 20 in the threaded piston stem 15. Cooperating with the washer 18, I have provided a pawl 21 presenting an abrupt face 22 and an inclined face 23 bearing against similar faces in the teeth of the washer 18. The washer 18 is held in position in the head 17 by a split ring spring 18ᵃ snapped into a groove in the head as best illustrated in Fig. 2. This pawl 21 when in operative position (as shown in Fig. 3) precludes turning movement of the washer 18 in counterclockwise direction as viewed in Fig. 3, while permitting such turning movement in clockwise direction. When the pawl 21 is withdrawn, as viewed in Fig. 4, the stem 15 may be turned relative to the head 17 in either direction. When the stem 15 is being turned in clockwise direction to expel lubricant from the barrel 12, the ratchet 21 is preferably in the position shown in Fig. 3 so that turning of said stem in the opposite direction will turn the head 17, the barrel 12 and nozzle 13 in counterclockwise direction to effect disengagement between the nozzle and the nipple. The withholding of the pawl 21 may conveniently be effected by sliding longitudinally a cam plate 30 engaged beneath the head of said pawl, while movement of the pawl in the opposite direction may be effected by the usual pawl spring. With a view to rendering unnecessary release of the handle of the gun during considerable turning movement of the piston 14 in one or more directions, I have provided ratchet mechanism operatively interposed between the threaded stem 15 and the handle 16. This ratchet mechanism may be of a type ordinarily used in connection with ratchet screw drivers and include the ratchet wheel 31 non-rotatably fixed relative to the shank 32 of the threaded stem 15. The handle 16 may provide an outer sleeve 33 surrounding the ratchet mechanism and having attached thereto a sleeve 34 slotted at 35 and 36 to receive ratchet pawls 38 and 39. The connection between the handle sleeve 33 and the slotted sleeve 34 may be changed by moving a pin 40 connected to the slotted sleeve 34 and passing through a slot in the handle sleeve 33 (see Fig. 1). When the pin 40 is at one end of the slot, the ratchet 38 is thrown out of commission, as shown in Fig. 7, the ratchet 39 being operative and permitting rotation of the handle in contraclockwise direction relative to the shank spindle 32, while locking these parts together during rotation of the handle in the opposite direction. Thus, when the pawls are in the relation shown in Fig. 7, oscillation of the handle will produce intermittent rotation of the threaded spindle 15 in counterclockwise direction, and where a right-hand thread is used to force the piston 14 forwardly in the barrel 12 to expel lubricant. When the pin 40 is in intermediate position in its slot, both the pawls 38 and 39 are in engagement with the ratchet teeth and no rotation of the handle relative to the shank or threaded piston is permitted. When the pin 40 is at the other end of its slot, the pawl 39 is thrown out of commission and the pawl 38 permits rotation of the handle relative to the shank in clockwise direction, as viewed in Fig. 8, while precluding movement in the opposite direction. This, therefore, is the proper setting when the piston 14 is being withdrawn in its cylinder preparatory to refilling the latter with lubricant.

For some purposes, the ratchet in the handle may be used independently of the ratchet in the head 17 and vice versa, but I prefer a combination of the two, especially where the threaded engagement between the piston stem 15 and rear head 17 is relatively loose.

In Figs. 10 and 11, I have shown a modification taking the place of the ratchet arrangement in the rear head 17, such modification including merely means for frictionally opposing rotation between the piston stem and head, this retardation to be effected where there is a tendency for the piston 14 to turn relative to the barrel 12 more easily than the nozzle 13 tends to turn relative to its engaged nipple during disengagement. The locking arrangement shown in Figs. 10 and 11 therefore includes spring fingers 50, 51 frictionally pressing against the exterior of the threads on the piston stem 15. If desired, I may provide means for throwing these frictional retarding devices out of operation, and to this end I have shown a longitudinally slidable sleeve 53 providing a slot 54 in which is engaged a pin 55 permitting limited longitudinal movement, the sleeve 53 presenting a ring 56 which, when slid to the position shown in Fig. 11, holds the spring fingers 50 out of operation while permitting their operation when slid back to the position shown in Fig. 10.

While I have shown and described a preferred form of one embodiment of my invention, it will be understood that major changes, including omission, alteration, substitution and reversal of parts, and even changes in the mode of operation, may be made without departing from the scope of my invention, which is best defined in the following claims.

Claims:

1. A lubricant compressor adapted to form a quick detachable connection with a lubricant receiving nipple by relative rotation to said nipple; comprising a barrel, a lubricant expelling piston therein, a threaded stem connected to said piston, a handle for rotating said stem, connecting means between said handle and said stem for turning said stem in one direction upon oscillation of said handle, said means permitting locking of said handle to said stem when said handle is rotated to connect or disconnect said compressor with a lubricant receiving nipple, and means connecting said barrel and said stem and serving to prevent backward rotation of said stem when said means is fixed in one position, said means resisting the forward rotation of said stem sufficiently to permit a connection to be formed between said compressor and said nipple by merely turning said handle.

2. A lubricant compressor comprising a barrel, a lubricant expelling piston therein, a threaded stem connected to said piston, a rear head for said barrel, said head having a recess therein, a washer interlocked with said threaded stem and located in said recess, ratchet and pawl means operatively carried by said head and washer to permit turning movement of said washer relative to said head in one direction while opposing such turning movement in the opposite direction, and spring means engaging said head and retaining said washer in said recess.

In testimony whereof, I have signed my name to this specification.

FRED S. CARR.